Patented Oct. 16, 1945

UNITED STATES PATENT OFFICE 2,386,766

QUATERNARY THIAZOLIUM COMPOUNDS AND MANUFACTURE THEREOF

Hans Andersag and Kurt Westphal, Wuppertal-Elberfeld, Germany, assignors to Winthrop Chemical Company, Inc., New York, N. Y., a corporation of New York No Drawing. Application December 30, 1936, Serial No. 118,260. In Germany January 28, 1936

3 Claims. (Cl. 260—251)

This invention relates to the manufacture of quaternary thiazolium compounds the quaternary nitrogen atom of which is connected by means of an aliphatic chain with a pyrimidine nucleus; it further relates to certain products obtainable by the said manufacture.

It is the object of the present invention to produce by chemical synthesis compounds having an anti-neuritic activity. A particular object is the synthesis of the anti-neuritic vitamin $B_1$ which has also been called "Aneurin."

Several investigators who have been concerned with scientific research work on the chemical nature of vitamin $B_1$ and of certain cleavage products obtained by splitting off vitamin $B_1$ have suggested that vitamin $B_1$ contains a quaternary thiazole ring which is substituted in the 4-position by a methyl group and in the 5-position by a hydroxyethyl group and the quaternary nitrogen atom of which is directly connected with a nuclear carbon atom of a pyrimidine ring which on its part is substituted by an amino and alkyl group. Certain investigators think that the most probable formula of vitamin $B_1$ is the following one:

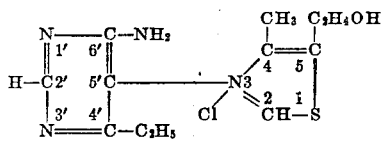

Other investigators have suggested that two methyl groups are attached to the pyrimidine ring in 2'- and 4'-position instead of the ethyl group standing in the above formula in the 4'-position of the pyrimidine ring. In view of their experimental results all investigators agree that a nuclear carbon atom of the pyrimidine nucleus is directly linked to the quaternary nitrogen atom of the thiazolium radical.

On account of our own experimental investigations regarding the nature of the natural vitamin $B_1$ we have formed another idea of the chemical structure of vitamin $B_1$. According to our idea in vitamin $B_1$ the pyrimidine radical is not directly linked by a nuclear carbon atom to the quaternary nitrogen atom of the thiazolium radical but is connected with the said quaternary nitrogen atom by means of an aliphatic bridge, in particular a methylene group. Indeed, we have succeeded in the synthesis of products having an antineuritic activity by the synthetic manufacture of thiazolium compounds having attached to the quaternary nitrogen atom by means of an aliphatic chain an amino pyrimidine radical, the aliphatic chain and the amino group being preferably attached to the 5- and 4-positions of the pyrimidine nucleus respectively. In particular we have found that by the synthesis of N-(2'-methyl-4'-amino-pyrimidyl-5'-methyl)-4-methyl-5-hydroxyethyl-thiazolium chloride of the following formula:

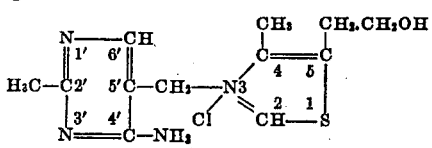

or its tautomeric formula:

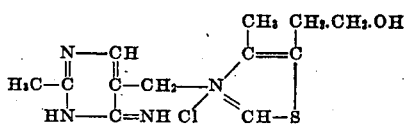

a product is obtained which proves to be identical with the natural vitamin $B_1$. The synthetic product forms the same crystals as the natural vitamin $B_1$; the said crystals have the same physical properties, for instance, same color, same solubility, same melting point and yield when mixed with crystals of the natural vitamin $B_1$ no decrease in the melting temperature. Furthermore, the new synthetic product shows the same chemical behaviour as the natural vitamin $B_1$ and most important of all is that it has the same antineuritic activity as the natural vitamin.

It has further been found that modifications of the vitamin $B_1$ are possible without depriving the modified products of the antineuritic activity. In particular the methyl groups in the 4-position of the thiazole part and in the 2'-position of the pyrimidine part may be replaced by other alkyl groups, such as the ethyl and propyl group. Even aryl groups, such as the phenyl group may stand instead of the said methyl groups. Likewise the methylene group forming the aliphatic bridge between the quaternary nitrogen atom of the thiazole part and the nuclear carbon atom of the pyrimidine part may be replaced by other aliphatic chains, for instance, the ethylene group. Also the hydroxyethyl radical standing in 5-position of the thiazole radical may be replaced by other hydroxyalkyl groups but it appears that this modification more than the other changes referred to above causes a considerable decrease of the antineuritic activity. The said hydroxyalkyl groups, particularly the hydroxyethyl group, may be esterified, for instance, by acetic acid and benzoic acid. Instead of the free amino group in the 4'-position a substituted amino group, for instance, an alkylated amino group may be present.

It results that by the present invention the vitamin $B_1$ which until now was obtained only from natural sources in a very cumbersome manner may be prepared by chemical synthesis according to the methods hereinafter described.

By the present invention it has further been established that also synthetic products which have a different but similar chemical constitution as compared with the chemical constitution of vitamin $B_1$ are distinguished by a more or less important antineuritic activity. Particularly those new synthetic products containing a higher number of carbon atoms than the natural vitamin $B_1$ in which two of the alkyl groups, standing in the 4-, 2'- and 5'-position of the pyrimidyl-alkylthiazolium compounds specified above, together contain more than two carbon atoms have shown a good antineuritic activity.

In accordance with the present invention the N-(amino-pyrimidylalkyl)-thiazolium compounds are obtained by reacting upon thiazoles, particularly upon 4-methyl-5-hydroxyethyl-thiazole, its homologues and acyl derivatives resp., with a reactive ester of an amino-pyrimidyl-alcohol, particularly with amino-pyrimidylalkyl-halides and -sulfonic acid esters, for instance, amino-pyrimidylalkyl-benzene or -toluene sulfonic acid ester. Compounds of the type of vitamin $B_1$ are formed when 2-alkyl-4-amino-pyrimidyl-5-alkyl-halides are caused to react with 4-methyl-5-hydroxyethyl-thiazole. The reaction is advantageously accelerated by heating, if desired, with the addition of a solvent or diluent. The reaction proceeds, for instance, according to the following equation:

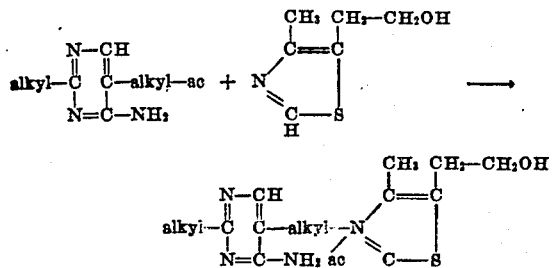

(ac standing for a reactive acyl radical which has the function of an anion in the reaction product.)

The above described process may be modified by using instead of a reactive ester of an amino-pyrimidyl alcohol a corresponding pyrimidine compound but containing instead of the amino group a substituent which can be transformed into an amino group. Such substituents are, for instance, halogen atoms, hydroxyl and mercapto groups. By such modification first pyrimidyl-alkyl-thiazolium compounds are obtained which contain in the pyrimidyl radical the said substituent which is capable of being transformed into an amino group, for instance, a halogen atom, a hydroxyl or mercapto group. The said substituent is then subsequently transformed into an amino- or alkylamino group, the hydroxyl and mercapto group being first preferably replaced by halogen atoms. Thus, for instance, N-(2'-methyl-4'-hydroxypyrimidyl-5'-methyl)-4-methyl-5-hydroxyethyl-thiazolium chloride, obtained from 2-methyl-4-hydroxypyrimidyl-5-methyl-chloride and 4-methyl-5-hydroxyethyl-thiazole, is first transformed into the 4'-chloro-compound and the latter is converted into the corresponding 4'-amino compound by the action of ammonia, a primary or secondary amine.

The pyrimidine starting components may be obtained by the processes described in our application for Letters Patent Serial No. 118,261 of even date.

The invention is further illustrated by the following examples without being restricted thereto:

Example 1.—2 grams of 2-methyl-4-amino-5-aminomethylpyrimidine-hydrochloride are distributed in 50 ccs. of concentrated hydrochloric acid and treated with a solution of 1 gram of sodium nitrite in 10 ccs. of water. After the evolution of nitrogen is complete the mixture is rendered alkaline with potassium carbonate while cooling and extracted with ether. After drying over potassium carbonate the ether is evaporated. The residue forms colorless crystals of the 2-methyl-4-amino-5-chloromethyl-pyrimidine. It is heated with 1 gram of 4-methyl-5-hydroxyethylthiazole for one hour to 140-150° C. The melt is repeatedly extracted with ether, the residue dissolved in anhydrous alcohol and ethereal hydrochloric acid is added. Thereby the hydrochloride of the (2'-methyl-4'-aminopyrimidyl-5'-methyl)-4-methyl-5-hydroxyethyl-thiazolium chloride separates. It melts at 250° C. while decomposing. It corresponds in its physical and chemical properties and with regard to its antineuritic activity to the vitamin $B_1$-crystals obtained from natural products.

The same product is also obtained in the following manner:

4 grams of benzene-sulfonic acid ester of the 2-methyl-4-amino-5-hydroxymethyl-pyrimidine, obtained by heating 1.4 grams of the hydroxyl compound with 3 grams of benzene sulfochloride to 100° C. and washing of the solidified melt with ether, are heated with 5 grams of 4-methyl-5-hydroxyethyl-thiazole for one hour to 150-160° C. The mixture is dissolved in alcohol and alcoholic hydrochloric acid is added to the first formed N-(2'-methyl-4'-aminopyrimidyl-5'-methyl)-4-methyl-5-hydroxyethyl-thiazolium-benzene sulfonate. Thereby the hydrochloride specified above separates.

When using 2-methyl-4-amino-5-bromomethyl-pyrimidine and ethereal hydrobromic acid the N-(2'-methyl-4'-aminopyrimidyl-5'-methyl)-4-methyl-5-hydroxyethyl-thiazolium-bromide-hydrobromide is obtained which decomposes at 220° C. On reacting its aqueous solution with silver nitrate (for instance, 3.9 grams of hydrobromide and 3.4 grams of silvernitrate), thoroughly stirring the mixture, filtering from the separated silver bromide, evaporating the filtrate to dryness and crystallizing the residue from dilute methyl alcohol, crystals of the corresponding nitrate are obtained which decompose at 166° C.

When using in the above described process 2-methyl-4-amino-5-(β-bromoethyl)-pyrimidine as the pyrimidine compound the N-(2'-methyl-4'-amino-pyrimidyl-5'-ethyl)-4-methyl-5-hydroxyethyl-thiazolium bromide is obtained which decomposes above 240° C. When using 4-amino-5-chloromethyl-pyrimidine the N-(4'-amino-pyrimidyl-5'-methyl)-4-methyl-5-hydroxyethyl-thiazolium-chloride is obtained which decomposes above 200° C.

Example 2.—50 grams of 4-amino-5-bromomethyl-6-methylpyrimidine-hydrobromide are heated with 100 grams of 4-methyl-5-hydroxyethyl-thiazole for 30 minutes on the water bath. After cooling the crystalline solidified melt is thoroughly stirred with ether, filtered with suction and washed with a large quantity of ether. The undissolved parts are recrystallized from methanol. In this manner the N-(4'-amino-6'-methyl-pyrimidyl-5'-methyl)-4-methyl-5-hydroxyethyl-thiazolium bromide-hydrobromide is obtained in the form of white crystals melting at 251° C. with decomposition.

The chloride-hydrochloride of the said compound melts at 243° C. with decomposition, its picrolonate at 216° C. with decomposition.

*Example 3.*—28.3 grams of 2-methyl-4-amino-5 - bromomethyl - pyrimidine-hydrobromide and 31.4 grams of 4-ethyl-5-hydroxyethyl-thiazole are heated for half an hour to 130-140° C. The melt is extracted with ether and recrystallized from aqueous alcohol. In this manner the hydrobromide of the 4-ethyl-5-hydroxyethyl-N-(2'-methyl - 4' - aminopyrimidyl - 5'-methyl) -thiazolium-bromide is obtained in the form of colorless needles melting at 217° C.

When using instead of 28.3 grams of the 2-methyl compound 29.7 grams of 2-ethyl-4-amino-5-bromomethyl-pyrimidine-hydrobromide the hydrobromide of the 4-ethyl-5-hydroxyethyl-N-(2'-ethyl-4'-aminopyrimidyl-5'-methyl)- thiazolium-bromide is obtained which melts at 220° C.

*Example 4.*—5 grams of 4-methyl-5-benzoyl-oxyethyl-thiazole are melted together with 2.8 grams of 2-methyl-4-amino-5-bromomethylpyrimidine hydrobromide for half an hour to 130-140° C. The melt is redissolved from dilute alcohol. In this manner the hydrobromide of the 4-methyl-5-benzoyl oxyethyl-N-(2'-methyl-4'-aminopyrimidyl-5'- methyl)-thiazolium-bromide melting at 245° C. is obtained. By splitting off the benzoyl group by means of dilute hydrobromic acid, evaporating under reduced pressure and redissolving of the residue from dilute alcohol the hydrobromide of the 4-methyl-5-hydroxyethyl-N-(2'-methyl-4'-aminopyrimidyl-5'-methyl)-thiazolium-bromide melting at 220° C. is obtained.

*Example 5.*—34.5 grams of 2-phenyl-4-amino-5-bromomethyl-pyrimidine-hydrobromide are introduced into 28.6 grams of 4-methyl-5-hydroxyethyl-thiazole, whereupon weak heating takes place. The mixture is heated to 130° C. for 30 minutes and after cooling several times extracted with ether. The part which cannot be dissolved in ether is recrystallized from dilute alcohol. It is obtained in this manner in white crystals melting at 228° C. They form the hydrobromide of the 4-methyl-5-hydroxyethyl-N-(2'-phenyl-4'-amino-pyrimidyl-5'-methyl)-thiazolium bromide.

*Example 6.*—34 grams of 2-methyl-4-amino-5 - bromomethyl - pyrimidine-hydrobromide are heated for half an hour to 120° C. with 50 grams of 4-methyl-5-acetoxyethyl-thiazole. The first thinly liquid melt soon solidifies to a viscous crystal cake. The latter is thoroughly stirred with methylenechloride after cooling and filtered with suction. By recrystallization from absolute alcohol coarse needles of the hydrobromic acid salt of the N-(2'-methyl-4'-aminopyrimidyl-5'-methyl)-4-methyl - 5 - acetoxyethyl-thiazolium-bromide are obtained which melt at 241° C. with decomposition.

A phenylurethane derivative of vitamin B₁ may be obtained in the following manner:

7 parts by weight of 4-methyl-5-hydroxyethyl-thiazole are heated with 6 parts by weight of phenylisocyanate for half an hour to 100° C. The solidified melt is recrystallized from benzene. The 4-methyl - 5 - phenylaminocarbethoxyethyl-thiazole formed is obtained in colorless crystals melting at 136° C. 10 grams of this compound are heated with 5 grams of 2-methyl-4-amino-5 - bromomethyl - pyrimidine - hydrobromide for half an hour to 130°-134° C. The melt is extracted with boiling benzene and the residue recrystallized from aqueous alcohol. Colorless crystals of the hydrobromide of 4-methyl-5-phenylaminocarbethoxyethyl - N - (2'-methyl-4'-aminopyrimidyl-5'-methyl)-thiazolium bromide are thus obtained.

*Example 7.*—3 grams of 2-methyl-4-amino-5-bromomethyl-pyrimidine-hydrobromide are heated with 3 grams of 4-methyl-5-gamma-hydroxypropyl-thiazole for half an hour to 120°-130° C. The first liquid melt solidifies already during heating. The mixture is washed with ether and recrystallized from alcohol. In this manner the hydrobromide of the 4-methyl-5-(gamma-hydroxypropyl)-N-[2'-methyl - 4'-aminopyrimidyl-5'-methyl]-thiazolium-bromide is obtained in the form of colorless needles which melt at 226° C. with decomposition.

When using instead of 2-methyl-4-amino-5-bromomethyl-pyrimidine-hydrobromide 3 grams of 2-ethyl-4-amino-5 - bromomethylpyrimidine-hydrobromide and instead of 4-methyl-5-gamma-hydroxypropyl-thiazole 3 grams of 4-methyl-5-hydroxyethyl-thiazole and working in the same manner as indicated in paragraph 1, the hydrobromide of the N-(2'-ethyl-4'-amino-pyrimidyl-5'-methyl)-4-methyl-5-hydroxyethyl-thiazolium bromide is obtained in the form of colorless crystals which melt at 236° C. with decomposition.

According to the methods described above preferably the halides of the thiazolium compounds are obtained. They may be transformed into salts with other acids by the well-known method of double decomposition. Thus the 4-methyl-5-hydroxyethyl- or -5-acyloxyethyl-N-(2'-methyl-4'-aminopyrimidyl-5'-methyl) - thiazolium halides are converted by treatment with silver-phosphate, -sulfate, -acetate, -lactate or -benzoate, if required with heating, into salts of the corresponding acids.

We claim:

1. The process of producing compounds having antineuritic properties which comprises condensing a 2-methyl-6-aminopyrimethyl aryl sulphonate with 4-methyl-5-β-hydroxy-ethyl thiazole.

2. The process of producing compounds having antineuritic properties which comprises condensing 2-methyl-6-amino-pyrimethyl - benzene sulphonate with 4-methyl-5-β-hydroxy-ethyl thiazole.

3. An antineuritic compound of the group consisting of the compounds having the formulae

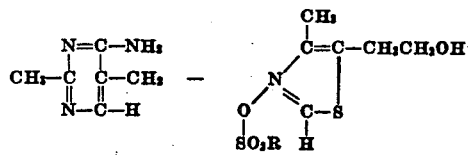

and

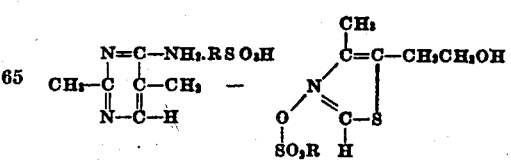

in which R is an aryl radical.

HANS ANDERSAG.
KURT WESTPHAL.